A. M. LINDSEY.
SPARK ARRESTER.
APPLICATION FILED FEB. 12, 1914.
1,122,288.
Patented Dec. 29, 1914.
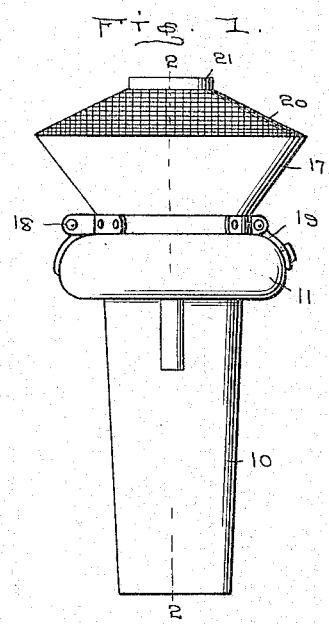
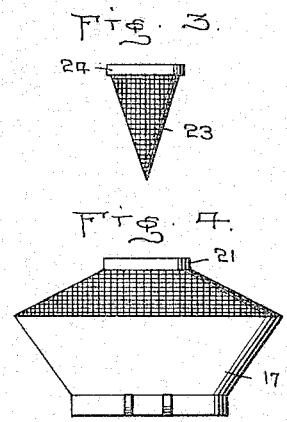
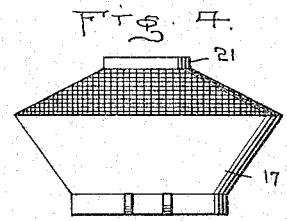
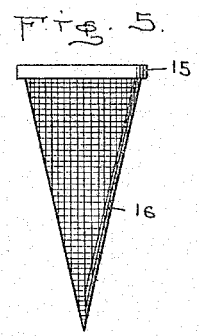
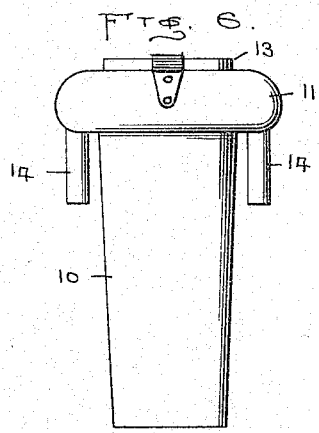
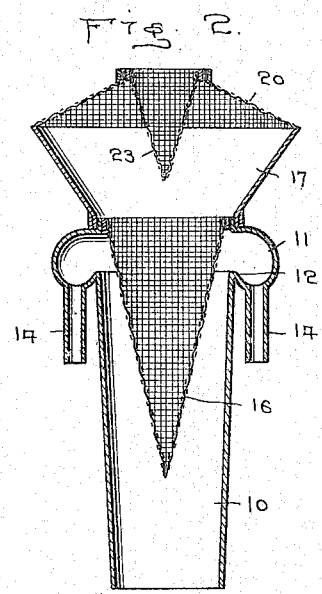
Witnesses
Inventor
A. M. Lindsey
By W. J. Fitzgerald & Co.
Attorney

UNITED STATES PATENT OFFICE.

ARCHIBALD M. LINDSEY, OF WALVILLE, WASHINGTON.

SPARK-ARRESTER.

1,122,288.

Specification of Letters Patent.

Patented Dec. 29, 1914.

Application filed February 12, 1914. Serial No. 818,212.

*To all whom it may concern:*

Be it known that I, ARCHIBALD M. LINDSEY, a citizen of the United States, residing at Walville, in the county of Lewis and State of Washington, have invented certain new and useful Improvements in Spark-Arresters; and I do hereby declare the following to be a full, clear, and exact description of the invention, such as will enable others skilled in the art to which it appertains to make and use the same.

The object of this invention is the provision of a spark arrester having a spark trap and means for deflecting the sparks into the trap.

Another object is to provide a device of this character wherein the several parts are conveniently accessible.

Another object is to provide a spark arrester of simple, efficient, durable, and inexpensive construction.

In the accompanying drawing wherein is shown a practical and approved embodiment of the invention Figure 1 is a side elevation of a spark arrester applied to a locomotive smoke stack. Fig. 2 is a sectional view on the line 2—2 of Fig. 1. Figs. 3, 4, 5 and 6 represent side elevations of the various parts of the stack and spark arrester detached.

Referring to the drawing in detail, the numeral 10 indicates the smoke stack preferably formed of sheet metal and gradually enlarged from its lower to its upper end, the latter being enlarged or bulged at 11 to provide an annular pocket or trap having its bottom disposed slightly below the turned edge 12 of the stack 29 to receive and retain the sparks blown upwardly through the stack 10, in a manner to be hereinafter clearly described.

The extreme upper end of the trap 11 is formed with an upstanding flange 13, while the bottom thereof communicates with two or more depending outlet pipes 14 through which the cinders are adapted to pass in leaving the trap, and a ring 15 is adapted to snugly fit within the flange 13 and is removably secured in position by suitable bolts or the like. An inverted foraminous cone 16 preferably formed of galvanized iron mesh having an open upper end is reliably secured within the ring 15 and depends therefrom a distance downwardly within the stack 10. It will be understood that the sparks flying upwardly within the stack 10 strike the inner wall of the cone 16 and are deflected laterally into the trap 11.

A cone or top member is hinged by a removable bolt 18 to the trap 11 and is formed at its lower edge with a flange adapted to surround the flange 13 when the parts are operatively assembled as shown in Figs. 1 and 2, a suitable locking device 19 is provided for securing the top member 17 in position upon the stock. The body of the member 17 is flared from its lower to its upper end, and a foraminous and upwardly tapered sheet of material 20 is secured over the upper end thereof and formed with an opening in its upper end in which is secured an annular ring 21. A second foraminous cone 23 of considerably smaller size than the cone 16 is secured to a band or ring 24 which latter is secured by suitable bolts or the like within the ring 21 in an inverted position as shown in Fig. 2.

From the foregoing it is apparent that the sparks flying upwardly within the stack 10 strike against the inclined wall of the cone 16 and are deflected into the trap 11 where they are either burned out or extinguished by a steam blast from the nozzle (not shown). The smaller sparks passing through the main or lower cone 16 are arrested either by the foraminous member 20 or the second or upper inverted cone 23.

The entire device may be quickly and conveniently disassembled, during the operation of the locomotive if necessary, by simply unlocking the cover or top member 17 at 19 thus giving access to the interior parts of the arrester.

What I claim is:—

1. In a spark arrester, a smoke stack having the upper end circumferentially bulged to provide a spark trap, the latter terminating in an upstanding flange, an upwardly flared imperforate member hinged to said trap and adapted to be seated on said flange, and a foraminous closure for the upper end of said flared member.

2. In a spark arrester, a smoke stack having the upper end circumferentially bulged to provide a spark trap, the latter terminating in an upstanding flared imperforate member hingedly secured exteriorly of said flange, a foraminous closure for the upper end of said flared member, and an inverted foraminous conical member depending from said annular flange into said stack and adapted to direct sparks into said trap.

3. In a spark arrester, a smoke stack having a bulged upper end forming a spark trap, an upwardly flared imperforate member hinged to said trap and a pair of concentrically alined inverted foraminous conical members depending from and projecting into said flared member and said stack respectively.

4. In a spark arrester, a smoke stack having a bulged upper end forming a spark trap and terminating in an upstanding annular flange, outlet pipes depending from and communicating with said trap, an upwardly flared imperforate member hinged to said trap, an orificed cap secured to said flared member and provided with an annular flange surrounding said orifice and a pair of inverted foraminous members one of said member being removably secured in each of said annular flanges.

In testimony whereof I have signed my name to this specification in the presence of two subscribing witnesses.

ARCHIBALD M. LINDSEY.

Witnesses:
M. E. CARTER,
C. L. CAVERLEY.

Copies of this patent may be obtained for five cents each, by addressing the "Commissioner of Patents. Washington, D. C."